US010462330B2

(12) United States Patent
Inui et al.

(10) Patent No.: US 10,462,330 B2
(45) Date of Patent: Oct. 29, 2019

(54) IMAGE READING DEVICE, PRESSURE PLATE OPENING/CLOSING DETECTION METHOD, AND IMAGE FORMING APPARATUS

(71) Applicants: Tetsuo Inui, Kanagawa (JP); Susumu Miyazaki, Tokyo (JP)

(72) Inventors: Tetsuo Inui, Kanagawa (JP); Susumu Miyazaki, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/939,375

(22) Filed: Mar. 29, 2018

(65) Prior Publication Data
US 2018/0302530 A1    Oct. 18, 2018

(30) Foreign Application Priority Data

Apr. 18, 2017    (JP) .................................. 2017-081956

(51) Int. Cl.
 *H04N 1/401*    (2006.01)
 *H04N 1/00*    (2006.01)
 (Continued)

(52) U.S. Cl.
 CPC ............. *H04N 1/401* (2013.01); *G03G 15/60* (2013.01); *H04N 1/00814* (2013.01);
 (Continued)

(58) Field of Classification Search
 CPC ........... H04N 2201/0081; H04N 1/193; H04N 2201/044; H04N 1/00087; H04N 1/00615;
 (Continued)

(56) References Cited

U.S. PATENT DOCUMENTS

2006/0245013 A1    11/2006    Ikeno et al.
2006/0250661 A1    11/2006    Susaki
 (Continued)

FOREIGN PATENT DOCUMENTS

CN    1855983 A    11/2006
CN    101547287 A    9/2009
 (Continued)

OTHER PUBLICATIONS

Office Action for Chinese Patent Application No. 201810343672.0 dated Jun. 25, 2019.

*Primary Examiner* — Negussie Worku
(74) *Attorney, Agent, or Firm* — Harness, Dickey & Pierce, P.L.C.

(57) ABSTRACT

An image reading device including a contact glass; a reading unit; a pressure plate; a pressure-plate opening/closing sensor; and circuitry. The circuitry determines a presence or absence of external light input to a space between the pressure plate and the surface of the contact glass based on image data obtained by the reading unit when the light source is turned off; compares read data according to light emitted from the light source and received by the image sensor when the pressure plate is closed, with read data of a reference value obtained when the pressure plate is completely closed, to obtain a difference and determine a state of the read data based on the difference; and determines whether the pressure plate is open or closed based on a determination result of the presence or absence of external light and on the difference.

7 Claims, 6 Drawing Sheets

(51) Int. Cl.
  *G03G 15/00*  (2006.01)
  *H04N 1/40*  (2006.01)
(52) U.S. Cl.
  CPC ....... *H04N 1/40056* (2013.01); *G03G 15/607* (2013.01); *G03G 2215/00189* (2013.01); *G03G 2215/0129* (2013.01)
(58) Field of Classification Search
  CPC ........... H04N 1/00997; H04N 1/02815; H04N 1/00018
  USPC ....... 358/474, 461, 406, 448, 488, 475, 486, 358/497, 498, 504, 463, 509; 399/301, 399/39, 51, 72; 382/199, 274, 312
  See application file for complete search history.

(56) References Cited

U.S. PATENT DOCUMENTS

| | | | | |
|---|---|---|---|---|
| 2007/0103735 | A1* | 5/2007 | Ikeno | H04N 1/00681 358/449 |
| 2009/0040575 | A1* | 2/2009 | Kim | H04N 1/4078 358/509 |
| 2009/0244649 | A1 | 10/2009 | Shinkawa | |
| 2011/0170886 | A1* | 7/2011 | Tomita | G03G 15/0131 399/38 |
| 2014/0078532 | A1* | 3/2014 | Nikaku | G03G 15/00 358/1.13 |
| 2015/0002908 | A1 | 1/2015 | Fujita | |
| 2015/0070737 | A1* | 3/2015 | Hirata | H04N 1/6044 358/504 |
| 2017/0111549 | A1* | 4/2017 | Miyazaki | H04N 1/0313 |
| 2017/0134598 | A1* | 5/2017 | Nagano | H04N 1/00559 |
| 2017/0142265 | A1* | 5/2017 | Horikawa | H04N 1/0057 |
| 2017/0142271 | A1* | 5/2017 | Kawai | H04N 1/00623 |
| 2017/0208208 | A1* | 7/2017 | Fujii | H04N 1/3878 |
| 2017/0248889 | A1* | 8/2017 | Uematsu | G03G 15/5062 |
| 2018/0262646 | A1* | 9/2018 | Gotoh | H04N 1/00742 |

FOREIGN PATENT DOCUMENTS

| | | |
|---|---|---|
| CN | 104253923 A | 12/2014 |
| JP | 2006-025284 | 1/2006 |
| JP | 2006-311175 | 11/2006 |
| JP | 2006-311219 | 11/2006 |
| JP | 2006-311316 | 11/2006 |
| JP | 2009-239929 | 10/2009 |
| JP | 2010-161637 | 7/2010 |
| JP | 2011-077648 | 4/2011 |
| JP | 2014-060550 | 4/2014 |
| JP | 2015-023395 A | 2/2015 |
| JP | 2015-154171 A | 8/2015 |

* cited by examiner

IMAGE READING DEVICE, PRESSURE PLATE OPENING/CLOSING DETECTION METHOD, AND IMAGE FORMING APPARATUS

CROSS-REFERENCE TO RELATED APPLICATIONS

This patent application is based on and claims priority pursuant to 35 U.S.C. § 119(a) to Japanese Patent Application No. 2017-081956, filed on Apr. 18, 2017, in the Japan Patent Office, the entire disclosure of which is hereby incorporated by reference herein.

BACKGROUND

Technical Field

Embodiments of the present disclosure relate to an image reading device, a pressure plate opening/closing detection method, and an image forming apparatus.

Background Art

In image reading devices, such as copiers, printers, facsimile machines, and multifunction peripherals, mounted on image forming apparatuses, a light source of a scanner emits reading light to a document on a contact glass, thereby generating electrical image data based on light reflected by the document, thus to perform processing such as image formation.

In reading a document, when external light enters the document surface or reading light leaks out, a document is not accurately read out. To avoid such circumstances, an openable pressure plate is disposed on a contact glass to shield the contact glass from external light, to thus prevent the leakage of reading light.

SUMMARY

In one aspect of this disclosure, there is provided an improved image reading device including a contact glass; a reading unit; a pressure plate; a pressure-plate opening/closing sensor, and circuitry. The contact glass has a surface on which a document is disposed or along which the document moves. The reading unit includes a light source configured to emit light to the document on the surface of the contact glass; and an image sensor configured to receive light reflected by the document, the reading unit configured to obtain image data according to the light received by the image sensor. The pressure plate is moveable between a posture where the surface of the contact glass is closed and a posture where the surface of the contact glass is closed. The pressure-plate opening/closing sensor is configured to detect whether the pressure plate is closed. The circuitry is configured to determine a presence or absence of external light input to a space between the pressure plate and the surface of the contact glass based on image data obtained by the reading unit when the light source is turned off; compare read data of the light emitted from the light source and received by the image sensor when the pressure plate is closed, with reference read data of the light emitted from the light source and received by the image sensor when the pressure plate is completely closed, to determine a difference between the read data and the reference read data; and determine whether the pressure plate is open or closed based on the presence or absence of the external light and the difference.

In another aspect of this disclosure there is provided an improved image forming apparatus including the above-described image reading device.

DETAILED DESCRIPTION

In image reading devices, when the pressure plate is completely closed, a pressure plate opening/closing sensor that includes, for example, a limit switch detects a closed state of the pressure plate. However, in a case of reading a thick document such as a book document, the pressure plate is sometimes not completely closed. In such a case, external light enters the interior of the contact glass through the space between the pressure plate and the contact glass. Even when the pressure plate opening/closing sensor detects the closed state of the pressure plate, the external light might enter the interior of the contact glass. That is, the detection of the pressure plate opening/closing sensor is not sufficiently reliable.

Further, when the pressure plate is in a half-open state, pressing force of the pressure plate toward the document is not sufficient to bring the document into close contact with a contact image sensor (CIS) of the scanner, so that external light enters the CIS or reading light leaks out of the image reading device. This might cause a deterioration in image quality in scanning.

The CIS includes a light source, such as a light-emitting diode (LED); a light-receiving lens; and a complementary metal oxide semiconductor (CMOS) image sensor arranged in line in a bar. The CIS emits light from the light source to the document while moving under the contact glass, and reads the light reflected by the document with the image sensor.

To handle the above-described failure, the technology is known that complements the mechanical detection of a closed state of the pressure plate by using the pressure plate opening/closing sensor, i.e., the technology to determine the presence or absence of external light by using the CIS. In such a technology, the image sensor of the CIS detects external light and further compares an output state (inclination and amplitude) of the CIS with the light source turned on, with another output state for when the pressure plate is properly closed.

However, the external-light detection method of the combination of the pressure plate opening/closing sensor and the CIS has difficulty in reliably detecting the closed state of the pressure plate due to the absence or a small amount of external light when the reading operation of the image reading device is performed in a dark place with no illumination at night or shielded from external light.

In using the image reading device in such a dark place without external light being input, a deterioration in image quality due to external light does not occur even if the pressure plate is not completely closed. However, in such a case, image quality deteriorates due to the leakage of light emitted from the light source to the outside through the gap between the pressure plate and the contact glass.

In any case, the CIS fails to accurately detect that the pressure plate is closed when the image reading device is disposed in the extremely dark environment.

In a method according to a comparative example, the data read by the CIS mounted on the reading unit is compared to the reference value to detect the presence or absence of external light and the degree of external light, thus determining the opening or closing state of, for example, the pressure plate, in a start of scanning the document.

However, such a method according to the comparative example, which performs merely detecting external light with a sensor, fails to reliably detect the closed state of the pressure plate when a reading operation is performed in a dark place without external light being input or with an extremely small amount of external light.

In view of the above circumstances, the present inventors have conceived of the following embodiments.

Figure 1:
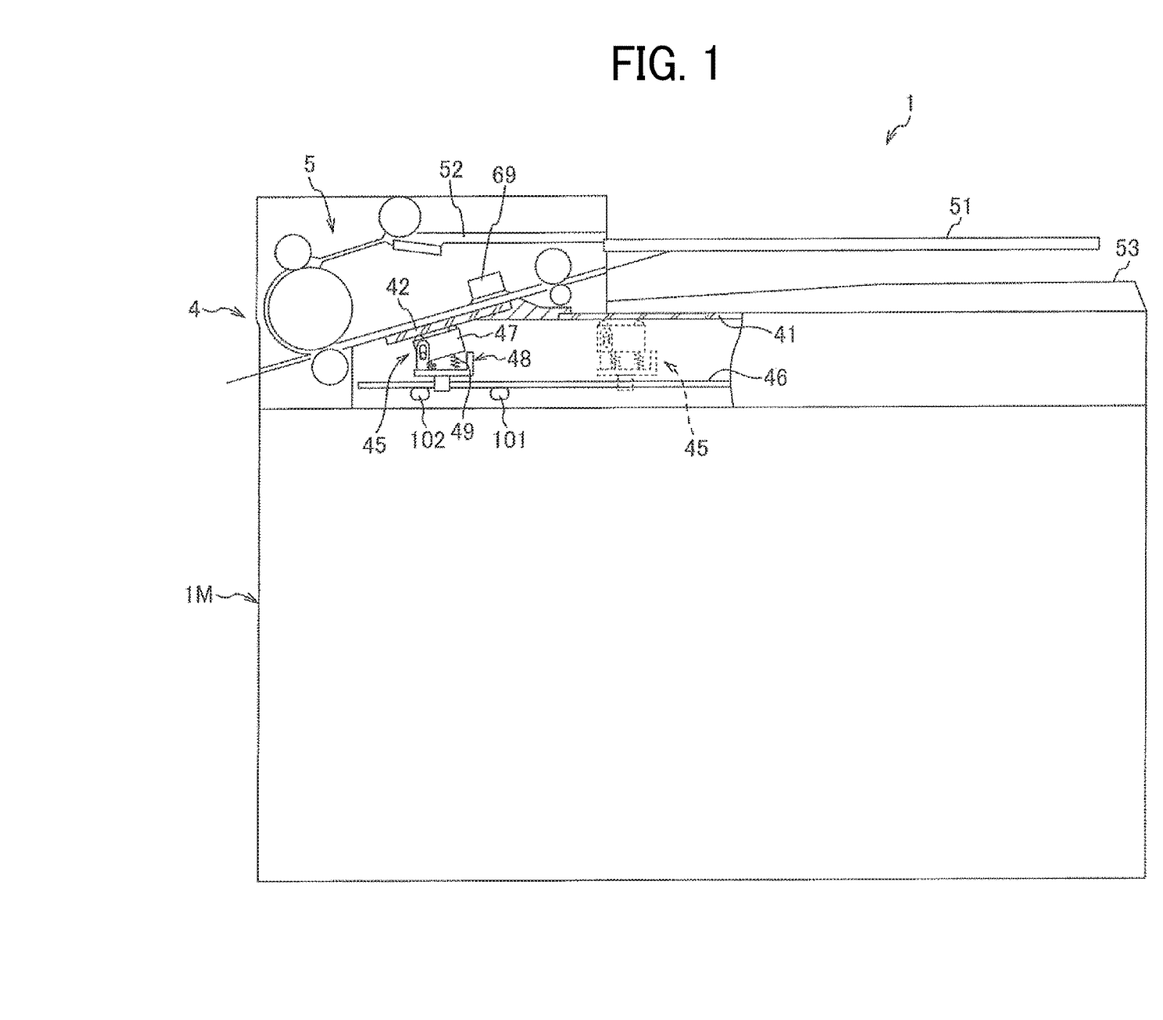
FIG. 1 is an illustration of a schematic configuration of an image forming apparatus provided with an image reading device according to an embodiment of the present disclosure.

Several exemplary embodiments of the present disclosure are described hereinafter with reference to drawings. FIG. 1 is an illustration of the configuration of an image forming apparatus 1 provided with an image reading device 4 according to an embodiment of the present disclosure.

The image forming apparatus 1, such as a copier, a printer, and a multifunction peripheral, includes an apparatus body 1M and an automatic document feeder (ADF) 5 mounted on the apparatus body 1M.

The apparatus body 1M includes a paper feeder, an image forming unit, a paper conveyor, an image reading device, and electrical components. The paper feeder accommodates recording paper and feeds the recording paper in forming an image. The image forming unit forms an image on the recording paper. The paper conveyor conveys the recording paper. The image reading device 4 reads an original image. In the image forming apparatus 1, the image forming unit forms an image on the recording paper fed by the paper feeder at the timing of reading the original image by the image reading device 4, and the paper conveyor discharges the recording paper having the image formed to the outside of the image forming apparatus 1.

The image reader 4a of the image reading device 4 is configured to switch between a document feeder (DF) scanner mode (conveyed-document reading mode) and a flatbed scanner mode (placed-document reading mode). In the DF scanner mode, the image reader 4a reads the original image during the automatic conveyance of document. In the flatbed scanner mode, the image reader 4a reads an image of a document placed on a flat contact glass.

In the flatbed scanner mode, the image reader 4a irradiates the image plane of a document (e.g., a document sheet, a cardboard, and a book) stationary on a flatbed contact glass (document table) 41 with light emitted from a light source mounted on the image reading device 4. The image reader 4a further converts the light reflected by the image plane into an image signal, thus achieving the readout of the original image.

In the DF scanner mode, the ADF 5 as a document pressure plate separates each one document sheet from the bundle of document sheets stacked on the document table 51 as a document-sheet mount table, and carries each one document sheet in a document-conveyance path 52, conveying the document along the document-conveyance path 52. During the conveyance, the document sheets sequentially get to partially face a DF contact glass 42 on the upper surface of the image reader 4a, starting from the upstream-side area in a direction of conveyance of document sheets. That is, the image reader 4a sequentially reads an image of the document sheet conveyed by the ADF 5 on the DF contact glass 42, which exercises the function of the DF scanner.

Note that the ADF 5 also serves as an openable document pressure plate, which means that the ADF 5 is attached by an opening/closing member, such as a hinge, to a rear part (a part on the back side) of the upper surface of the apparatus body 1M. The ADF 5 is configured to take an open position for opening the flatbed contact glass 41 with respect to the apparatus body 1M and a closed position in which the document is pressed toward the flatbed contact glass 41.

Figure 2A:
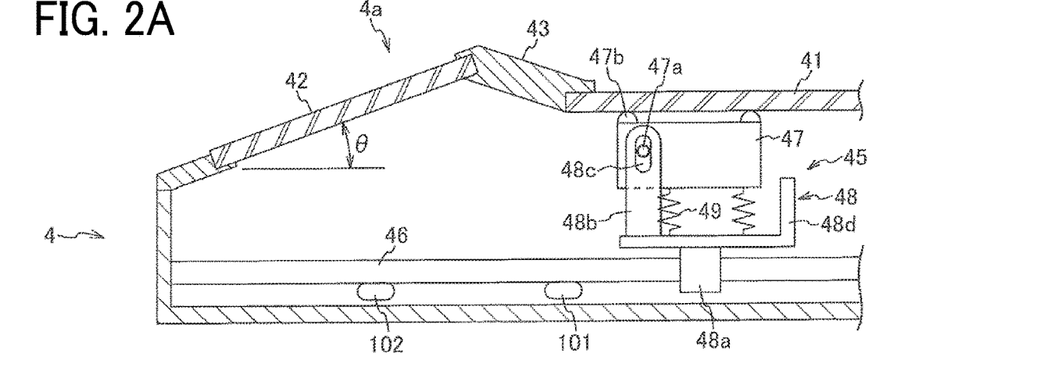
FIGS. 2A, 2B, and 2C are illustrations of the configuration and operations of the image reading device according to at least one embodiment of the present disclosure.
Figure 2B:
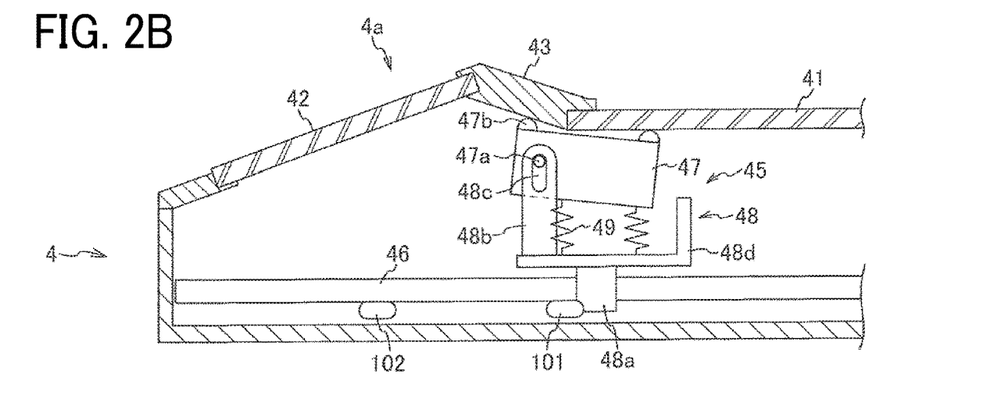
Figure 2C:
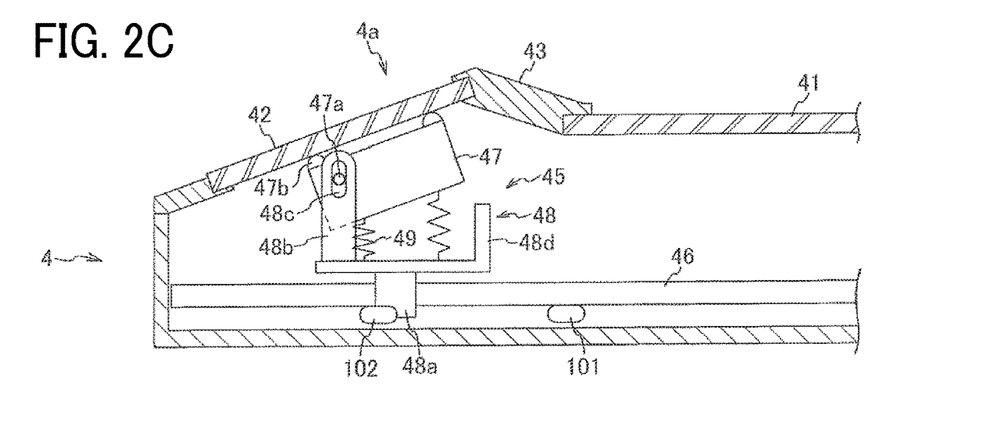

FIGS. 2A, 2 B, and 2 C are illustrations of the configuration and operations of the image reading device 4.

The flatbed contact glass 41, which is used in the flatbed scanner mode of the image reading device 4, is configured to face the image plane of a document sheet to be read when the document sheet is placed on the flatbed contact glass 41. The DF contact glass 42, which is used in the DF scanner mode of the image reading device 4, is configured to face the image plane of a document sheet passing through a predetermined reading position in the document-conveyance path 52. Further, the DF contact glass 42 is inclined to form a preset inclination angle θ with respect to the flatbed contact glass 41.

In the interior of the image reader 4a, a first reading unit 45 and a guide rod 46 extending in the lateral direction in FIGS. 2A, 2B, and 2C are disposed.

The first reading unit 45 includes an integral optical scanning unit 47, a bracket 48 for holding the integral optical scanning unit 47, a plurality of compression coil springs 49 (elastic member) that is incorporated in a compressed state between the integrated optical scanning unit 47 and the bracket 48.

The integral optical scanning unit 47 is configured as a contact image sensor (CIS) holding an equal magnification image-forming element roof-mirror lens array, an optical-path separation mirror, an equal-magnification image sensor, and an illumination light source, in, e.g., a mold frame. The integral optical scanning unit 47 is capable of line-scanning an image in a high resolution in the main scanning direction, and is configured to have a large depth of focus that enables reading an image of, e.g., a book document. The integral optical scanning unit 47 is not limited to a specific type of configuration, and has any configuration that is applicable to the DF scanner and the flatbed scanner. The main scanning direction is parallel to both the upper surface of the flatbed contact glass 41 and the upper surface of the DF contact glass 42.

The bracket 48 includes a lower slider section 48a supported by the guide rod 46, a pair of holding arm sections 48b for holding the integral optical scanning unit 47, and a bracket body 48*d* integrated with the lower slider section 48*a* and the pair of holding arm section 48*b*. In the present embodiment, the lower slider section 48*a* is a tubular member fixed to a lower side of the bracket body 48*d*, in the longitudinal center of the bracket body 48*d*. The pair of holding arm sections 48*b* includes a pair of plate-shaped bodies projecting upward from both ends of the bracket body 48*d*. The pair of holding arm sections 48*b* includes a slot (an oval hole) 48*c* that extends in the vertical direction to hold a projection 47*a* projecting beyond both end faces of the integral optical scanning unit 47 such that the projection 47*a* is changeable in postures around the longitudinal axis and in the vertical direction.

The plurality of compression coil springs 49 is configured to press the lower surface of the integral optical scanning unit 47 upward (to the flatbed contact glass 41 in FIG. 2A and to the DF contact glass 42 in FIG. 2C) at a plurality of positions in the main scanning direction.

The integral optical scanning unit 47 includes rectangular and circular upper slider sections 47*b* each being slidably movable in the sub-scanning direction while contacting the lower surface of at least one of the flatbed contact glass 41 and the DF contact glass 42. In some embodiments, the upper slider sections 47*b* are projections that extend in the longitudinal direction or the shorter-side direction of the integral optical scanning unit 47 and are spaced apart from each other in the direction orthogonal to the extending direction. Further, the upper slider section 47*b* includes, for example, a plurality of hemispherical projections. In any case, the upper slider section 47*b* is made of an unlubricated material having a low coefficient of friction and a good sliding property with respect to the lower surface of the flatbed contact glass 41 and the DF contact glass 42 or a guide surface alternative thereto.

The integral optical scanning unit 47 is movable guided by the guide rod 46 disposed on the lower side of the bracket 48 in the sub-scanning direction. The integral optical scanning unit 47 has the upper surface slidably contact both or one of the flatbed contact glass 41 and the DF contact glass 42. This configuration restricts the inclination of the guide rod 46 around the axis while allowing the first reading unit 45 to be movable along the guide rod 46.

The first reading unit 45 scans the image plane of the document on the flatbed contact glass 41 in the main scanning direction while moving in the sub-scanning direction, thereby reading an image of the document. Further, the first reading unit 45 line-scans the image of document passing through the upper surface of the DF contact glass 42 in the main scanning, thereby reading the image of the document.

In the interior of the image reader 4*a*, a timing belt formed in an endless loop is disposed having one portion in the circumferential direction fixed with the bracket 48 of the first reading unit 45. Further, a plurality of timing pulleys stretching and entraining the timing belt and a motor that drives one of the timing pulleys to rotate are disposed in the interior of the image reader 4*a*.

In the present embodiment, the second reading unit 69 is disposed on a transparent plate (the upper-side contact glass) on the ADF side, i.e., on the upper side of the DF contact glass 42. In this case, the route for conveying the document is disposed between the DF contact glass 42 and the second reading unit 69. The second reading unit 69 serves to read the upper surface of the document sheet conveyed on the DF contact glass 42. The second reading unit 69 includes a contact image sensor (CIS) same as the integral optical scanning unit 47 constituting the first reading unit 45. In the flatbed scanner mode, the first reading unit 45 moves from the home position to the right in the drawing sheet while moving from the home position near the position indicated by the solid line in, e.g., FIG. 1 to one side in the sub-scanning direction. Subsequently, the integral optical scanning unit 47 performs line scanning for each length of slight movement to read an image of the surface (the lower surface) of the document placed on the flatbed contact glass 41. When the reading operation is completed, the first reading unit 45 returns to the home position again.

In the DF scanner mode, the first reading unit 45 moves from the home position indicated by the solid line in FIG. 1 to another home position indicated by the broken line under the DF contact glass 42. The first reading unit 45 moves from the home position to the other side in the sub-scanning direction and stops below the DF contact glass 42 or reads the image of the surface of the conveyed document passing over the DF contact glass 42.

In this manner, the first reading unit 45 is movable in the sub-scanning direction to be positioned under the flatbed contact glass 41 and the DF contact glass 42. The integral optical scanning unit 47 changes the posture between a first reading posture and a second reading posture according to a position in the sub-scanning direction. In the first reading posture, the integral optical scanning unit 47 is in a horizontal posture to read an image through the flatbed contact glass 41. In the second reading posture, the integral optical scanning unit 47 is inclined to read an image through the DF contact glass 42.

The ADF 5 includes a document table 51 as a document mount table on which a standard sheet is placed; a document-conveyance path 52 for conveying a document sheet to allow reading an image of the document sheet; and an output tray 53 on which the document sheets having images readout are stacked. The document table 51 and the output tray 53 are placed one on top of the other such that at least a part of them are spaced apart, which allows downsizing.

Figure 3:
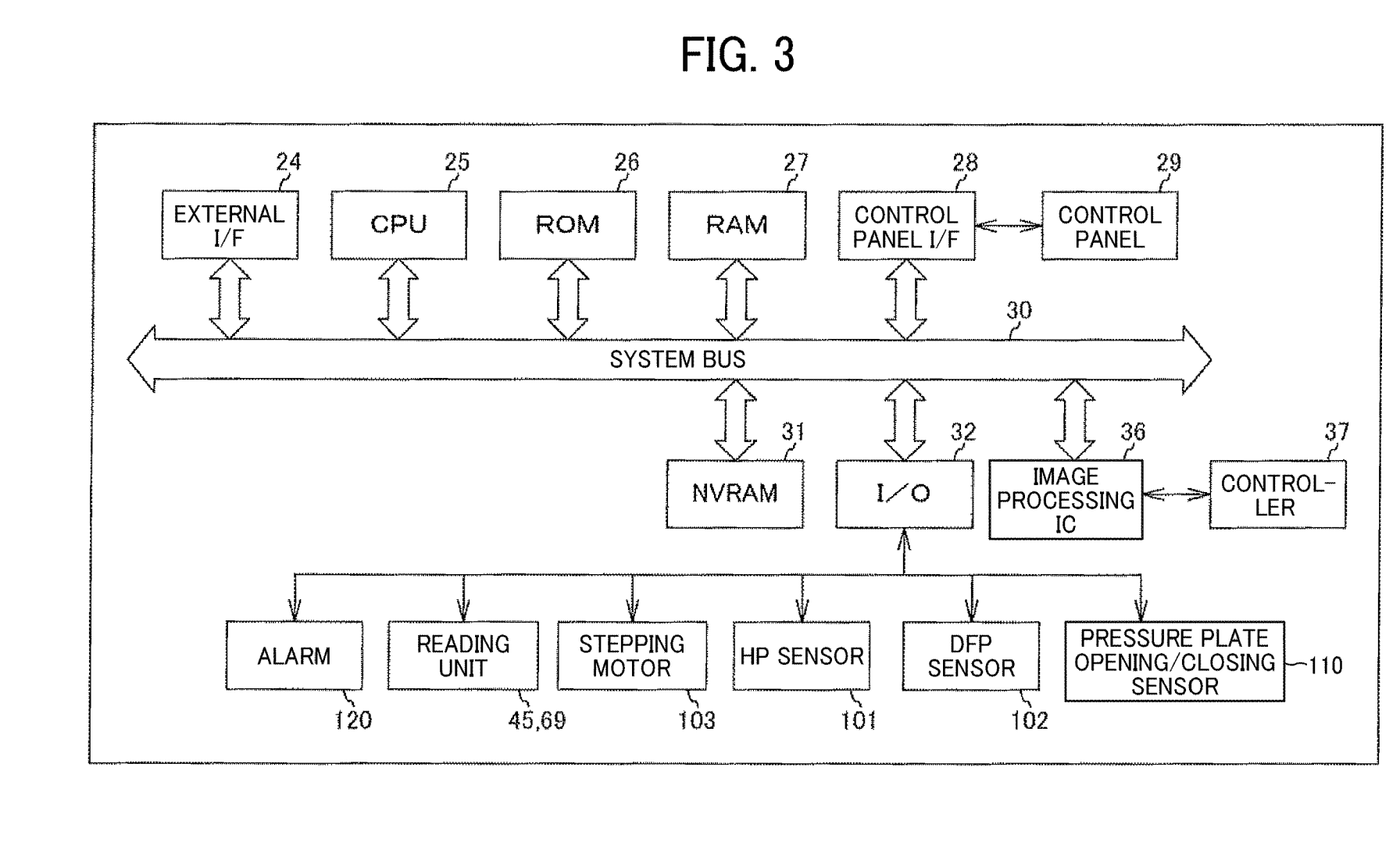
FIG. 3 is a hardware block diagram of the image reading device of FIGS. 2A, 2B, and 2C.

FIG. 3 is a hardware block diagram of an image reading device 4. As illustrated in FIG. 3, the image reading device 4 includes a central processing unit (CPU) 25, a read only memory (ROM) 26, a system bus 30, an input-output (I/O) 32, and various sensors such as a home position (HP) sensor 101 and a document feeder position (DEP) sensor 102. The CPU 25 collectively controls access to the system bus 30 connected with various devices based on the control program stored in the ROM 26. The CPU 25 further controls an input and output of electrical components such as the various sensors (the HP sensor 101 and the DEP sensor), the first reading unit 45, the motor 103, a clutch, and solenoid, which are connected to the system bus 30 via the I/O 32. The HP sensor 101 and the DEP sensor 102 serve to detect whether the first reading unit 45 is positioned under the DF contact glass 42, i.e., the ADF reading position, in the ADF mode (in the DF scanner mode).

Figure 6:
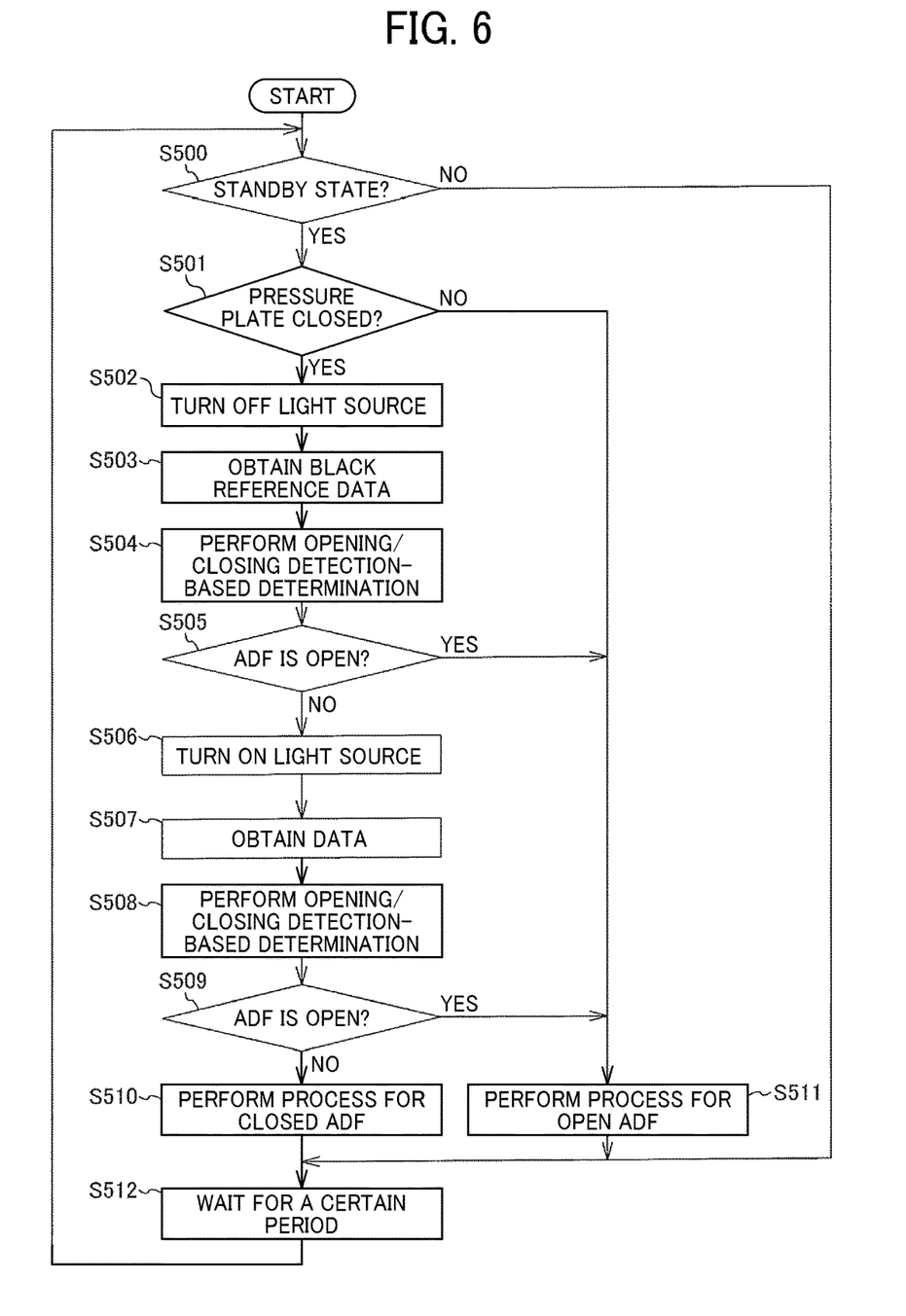
FIG. 6 is a flowchart of an ADF (a pressure plate) opening/closing detection method.

That is, the ROM 26 stores the control program of the CPU 25 in the flowchart as illustrated in FIG. 6. In addition to executing the control program stored in the ROM 26, the CPU 25 is capable of communicating with an external device, such as a host computer, via the external interface (I/F) 24.

The RAM 27 serves as, e.g., a main memory and a work area of the CPU 25, and is used for, e.g., a developed area of recorded data storage and a stored area of environmental data. The image reading device 4 further includes a non-volatile random access memory (NVRAM) 31. In the NVRAM 31, information regarding the image reading device 4 used for the control program is stored.

A control panel 29, which is connected to the system bus 30 via a control panel I/F 28, of the image reading device 4 enables setting, e.g., a scan mode.

The stepping motor 103 moves the first reading unit 45 in the sub-scanning direction. An image processing integrated circuit (IC) 36 transmits image data read by the first reading unit 45 to a controller 37.

Figure 4A:
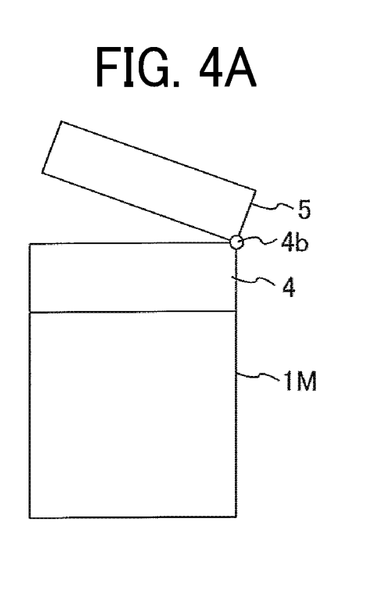
FIG. 4A is a side view of an automatic document feeder (ADF) in an open state.
Figure 4B:
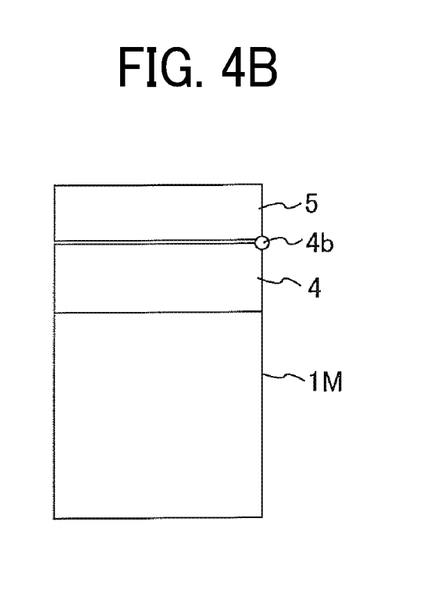
FIG. 4B is a side of view of the ADF in a closed state.
Figure 5A:
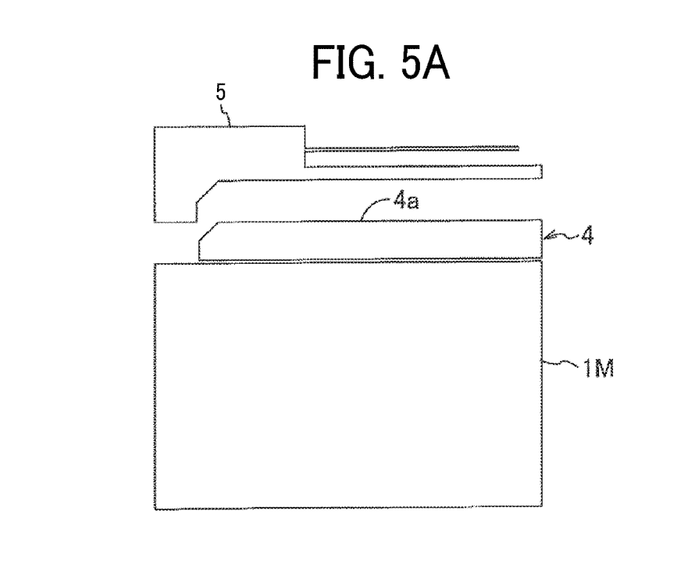
FIGS. 5A and 5B are a front view and a right-side view of the image forming apparatus with the ADF open, showing the appearance state.
Figure 5B:
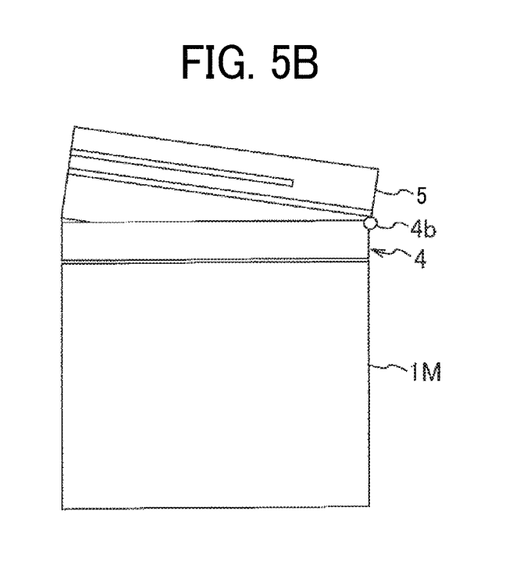
Figure 5C:
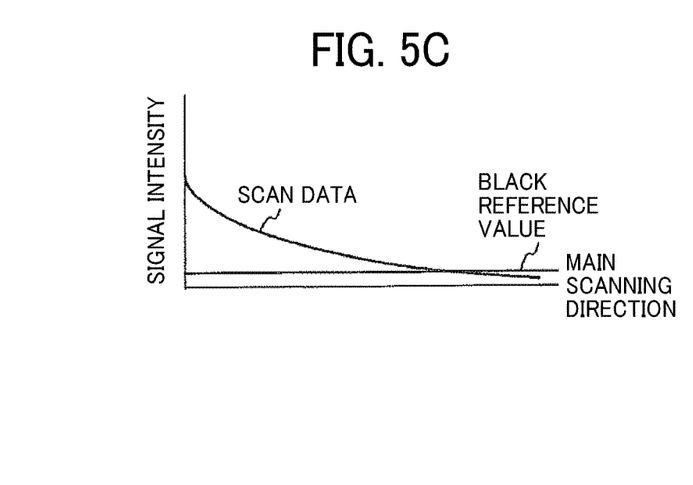
FIGS. 5C and 5D are graphs of data read by an integrated optical scanning unit in detecting external light when the ADF is open as illustrated in FIG. 5B.
Figure 5D:
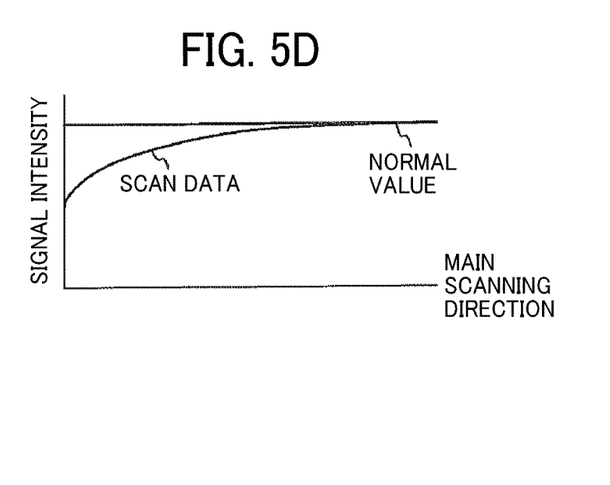

FIGS. 4A and 4B are side views of an open ADF 5 and a closed ADF 5, respectively. FIGS. 5A and 5B are a front view and a right-side view of the image forming apparatus 1 with the ADF opened, showing the appearance state. FIGS. 5C and 5D are graphs of data read by the integrated optical scanning unit (CIS) 47 in detecting external light when the ADF is open as illustrated in FIG. 5B.

FIGS. 5A and 5B are schematic views of the image forming apparatus 1 with the ADF 5 opened using a rear-side hinge 4b to open up the flatbed contact glass 41 of the image reader 4a to the outside of the image forming apparatus 1. Note that the image reading device 4 fails to read data with the light source turned off in the dark place without the external light. This means that the data of FIGS. 5C and 5D is all obtained under the environmental conditions in which external light is input to the image reading device 4.

The ADF 5 is supported by, e.g., the rear-side hinge 4b, to be openable and closeable with respect to the image reading device 4. The ADF 5 is inclined with the rear-side hinge 4b as a fulcrum located on the right side of FIG. 5B.

When the image reading device 4 (image forming apparatus 1) is powered on and the ADF 5 is opened, external light enters an image sensor (a photosensor) of the integral optical scanning unit 47 even with the light source turned off. FIG. 5C indicates an example of data read by the image reading device 4 with the light source turned off, in such a case. When the ADF 5 is opened, the reference white plate provided on the lower surface of the ADF 5 is inclined with respect to the first reading unit 45 (integrated optical scanning unit 47) provided on the image reader 4a side. In this case, an open space increases to the front side and decreases to the rear side of the image forming apparatus 1. As the open space increases, more external light enters the image reading device 4, which means that the intensity of light decreases in a direction from the front side to the rear side, i.e., the main scanning direction of the image forming apparatus 1. This reflects changes in signal intensity in data (read data) read by the image reading device 4. When a part of the read data, particularly the value for the front side exceeds the black reference value, external light is considered to be contained in the image reading device 4. As a result, the ADF 5 is considered to be open. Note that the black reference value is a value of the read data when the ADF 5 is detected to be completely closed and no external light enters the image reading device 4. A black reference section for obtaining the black reference value is fixed at a position apart from the contact glasses 41 and 42 to be less likely to be influenced by incident light, e.g., on the lower surface of a top plate 43 disposed between the contact glasses 41 and 42.

The image reading device 4 also performs shading correction for adjusting density of a read image by turning on the light source to read the reference white plate, in maintenance. More specifically, the image reading device 4 acquires data for the white reference before reading the document, and subsequently performs the shading correction on the read data of the document using the white reference data. The reference white plate is provided at an appropriate position on the side of the ADF 5, i.e., an end of the DF contact glass 42, for example, at a position of the second reading unit 69 in FIG. 1 at which the reading operation of the second reading unit 69 is not hampered. The reference white plate moves with opening or closing of the ADF 5, which thus changes the distance between the reference white plate and the image sensor of the integral optical scanning unit 47. In the present embodiment, the image reading device 4 reads the inclined reference white plate in the same manner of the reading operation as in the shading correction (by turning on the light source). As illustrated in FIG. 5D in which the light source is turned on, data obtained by reading the reference white plate indicates that the signal intensity decreases with an increase in distance from the light source and the reference white plate. The open space increases in a direction from the rear side to the front side (the left side in FIG. 5B) of the image forming apparatus 1, i.e., the distance between the light source and the reference white plate increases in the direction from the rear side to the front side. As a result, the signal intensity decreases in the direction from the rear side to the front side of the image forming apparatus 1 because the reading light leaks out more with an increase in distance between the light source and the reference white plate. Further, the distance between the light source and the reference white plate decreases in a direction from the front side to the rear side (the right side in FIG. 5B) of the image forming apparatus 1, thereby reducing the amount of scattering light of the reading light in the direction from the front side to the rear side, resulting in an increase in signal intensity in the direction from the front side to the rear side. In determining that the ADF 5 is closed when the light source is turned on, the image reading device 4 compares data (the normal value) obtained in advance when the ADF 5 is completely closed, with current data currently obtained when the ADF 5 is open and the reference white plate is inclined (the light source is turned on), and checks the presence or absence of attenuation in signal intensity in data. When the attenuation is absent, the image reading device 4 determines that the ADF is closed.

When the ADF 5 is open as illustrated in FIGS. 5A and 5B, the second reading unit 69 is also open. The second reading unit 69 is disposed on the lower surface of the ADF 5 above the DF contact glass 42, and the route for conveying the document is disposed between the DF contact glass 42 and the second reading unit 69. Same as the first reading unit 45, the second reading unit 69 obtains data as illustrated in the graphs of data examples in FIGS. 5C and 5D. In other words, the image reading device 4 determines the opening of the ADF 5 based on data read by the first reading unit 45 or data read by the second reading unit 69. Alternatively, in some embodiments, the image reading device 4 determines based on the combination of data obtained by the two reading units 45 and 69.

The reference white board to be read by the second reading unit 69 is provided at a position close to the image reader 4a, and the black reference section corresponding to the second reading unit 69 is provided at a position close to the ADF.

The above-described image reading device 4 includes contact glasses 41 and 42, reading units 45 and 69, a pressure plate (the ADF 5), a pressure-plate opening/closing detection unit (a pressure-plate opening/closing sensor 110), an external-light presence/absence determination unit, a difference determination unit, and a control unit. Over and along the entire surfaces of the contact glasses 41 and 42, a document is placed and moved. Each of the reading units 45 and 69 includes a light source for illuminating light to a document on the surface of one of the contact glasses 41 and 42, and an image sensor (a photosensor) for receiving light reflected by the document. The pressure plate moves to change between the posture in which surfaces of the contact glasses 41 and 42 are open and the posture in which the contact glasses 41 and 42 are closed. The pressure-plate opening/closing detection unit detects the open posture and the closed posture of the pressure plate. The external-light presence/absence determination unit determines the presence or absence of external light input to the gap between the pressure plate and the surface of the contact glass 41 or 42, based on an image data (an image data obtained with the light source turned off under the external light) input by the reading unit 45 or 69. The difference determination unit compares data obtained and received by the photosensor when the pressure plate is closed and the light source of the reading unit 45 or 59 is turned on, with data as the reference value obtained when the pressure plate is completely closed and the light source is turned on, to obtain a differential value and determine whether there is an attenuation in data or not and the like. The control unit determines, based on a determination result of the external-light presence/absence determination unit and a determination result of the difference determination unit, whether the pressure plate is open or closed.

In some embodiments, the external-light presence/absence determination unit and the difference determination unit are implemented by the CPU (a control unit). That is, the external-light presence/absence determination unit and the difference determination unit are implemented by software or hardware.

Note that the external-light presence/absence determination unit performs the determination process based on data obtained by the reading units 45 and 69's reading the black reference section.

Further, the difference determination unit performs the determination process based on data obtained by the reading units 45 and 69's reading the reference white plate provided on the pressure plate.

The configuration according to at least one embodiment of the present disclosure increases the accuracy of detection of the closed state of the pressure plate by using data obtained by turning on the light source of the reading units 45 and 69 and receiving light reflected from the reference white plate. That is, the image reading device 4 detects external light using the pressure-plate opening/closing sensor 110 and the image sensor with the light source turned off. The image reading device 4 further compares output of the image sensor with the light source turned on, with output of the image sensor with the pressure plate completely closed, so as to determine whether the pressure plate is completely closed or not.

This configuration allows accurately determining whether the pressure plate is completely closed or not even when the reading operation of the image forming apparatus 1 is performed in a dark place where external light cannot be reached.

Next, FIG. 6 is a flowchart of a method of detecting an opening/closing of the ADF 5. The following describes the method of detecting an opening/closing of the ADF 5 through the detection of external light, referring to the flowchart in FIG. 6.

In this flowchart, an ADF is used as an example of the pressure plate.

First, in step S500, the CPU 25 determines whether the image forming apparatus 1 (the image reading device 4) is in standby mode. The standby mode refers to the state in which no instruction is issued and the image forming apparatus 1 (the image reading device 4) is waiting for an instruction to be made by a user. When an affirmative determination is made (Yes in step S500), the process goes to step S501 for determining the state of the pressure-plate opening/closing sensor 110. When a negative determination is made (No in step S500), the process skips to step S512 for waiting for a period of time. In such a non-standby case, the process skips to the waiting mode in step S512 because the reading units 45 and 69 used for the opening/closing detection operation are presumed to be in use for a reading operation other than the opening/closing detection operation when any reading operation is being executed. Alternatively, in some embodiments, the CPU 25 determines whether the image forming apparatus 1 (the image reading device 4) is in standby mode or nor by determining whether the reading units 45 and 69 are usable or not.

In step S501, the pressure-plate opening/closing sensor 110 determines whether the pressure plate is closed. When an affirmative determination is made (Yes in step S501), i.e., the pressure plate (the ADF 5) is closed, the process goes to step S502 for the light source to start the pressure-plate opening/closing detection process using the read data. When a negative determination is made (No in step S502), i.e., the pressure plate (the ADF 5) is open, the process goes to step S512 for waiting for the period of time.

The pressure-plate opening/closing sensor 110 serves to mechanically detect the opening and closing of the ADF 5. The detection performance fluctuates with the conditions of reading the document, such as the thickness of a document, which means that the detection performance is not reliable. Accordingly, the following steps for the opening/closing detection process are separately performed.

In step S502, which is performed after determining that the pressure plate 5 is closed using the pressure-plate opening/closing sensor 110, the CPU 25 turns off the light source before starting a reading operation to get ready for reading the black reference section disposed close to the image reader 4a, using the image sensor.

In step S503, the CPU 25 obtains read data (black reference data) of the black reference section using the image sensor with the light source turned off. In step S504, the control unit (CPU 25) (the external-light presence/absence determination unit) performs an opening/closing detection determination through detection of the presence or absence of external light, based on the read data obtained in step S503 for obtaining the black reference data. The CPU 25 obtains the read data according to the degree of opening of the ADF 5, as illustrated in FIG. 5C for the case in which the light source is turned off. Accordingly, the CPU 25 determines whether the ADF is open or closed by determining how much degree the read data exceeds the black reference (threshold) value. In the present embodiment, the CPU 258 determines that the ADF 5 is open when data in the main scanning direction exceeds the black reference value. As illustrated in FIG. 5C, the data tends to incline according to the intensity of external light. Accordingly, in some embodiments, the CPU 25 calculates the slope of the signal intensity using the approximation formula of the regression line based on the read data. Then, the CPU 25 determines that the ADF 5 is open when the calculated slope is greater than a predetermined slope. The regression line refers to a straight line representing the central distribution tendency of the two sets of data, and is obtained by the least squares method.

The control unit (CPU) 25 determines whether the ADF 5 is open in step S505 for the opening/closing detection determining process. When an affirmative determination is made (Yes in S505), the process goes to step 511 for the ADF opening process. When a negative determination is made (No in step S505), i.e., the ADF is closed, the process goes to step S506 for turning on the light source.

In step S506 for turning on the light source, the CPU 25 turns on the light source before the reading units 45 and 69 start reading the document, to illuminate the reference white plate with reading light to thereby get ready for reading the white reference data and perform the reading operation. Subsequently, the CPU 25 obtains read data in step S507. In step S506, the reading units 45 and 69 are stopped without moving while the light source is turned on.

In step S508 for the opening/closing detection determining process, the CPU 25 determines whether the ADF 5 is open based on the read data obtained in step S507. When the ADF 5 is open, the CPU 25 captures data corresponding to light reflected by the reference white plate that is inclined. The CPU 25 obtains the read data according to the degree of opening of the ADF 5, as illustrated in FIG. 5D for the case in which the light source is turned on. Accordingly, the CPU 25 compares currently read data with the read data (the normal value) preliminarily obtained by reading the reference white plate with the ADF 5 properly closed, so as to determine whether the ADF 5 is open or closed. In other words, the difference determination unit compares the read data for light emitted from the light source and received by the image sensor when the ADF 5 is closed, with the read data as the reference value for light emitted from the light source and received by the image sensor when the ADF 5 is completely closed, so as to obtain the difference and determine the presence or absence of data attenuation. Alternatively, the CPU 25 performs such a difference determination process.

The opening/closing detection determination in step S508 is performed on the basis that the negative determination is made in step S505 (No in step S505) for determining whether the ADF 5 is open or not based on the black reference data, i.e., on the basis that the image reading device 4 is not influenced by external light. Accordingly, when the ADF 5 is open to allow external light to be input to the image reading device 4 in turning on the light source in step S506, the amount of light received by the reading units 45 and 69 decreases relative to an increase in distance from the light source to the reference white plate. As a result, the CPU 25 determines that the ADF 5 is open.

After determining that the ADF 5 is closed by performing the determination based on the black reference data in steps S503 and S504, the CPU 25 further determines whether the ADF 5 is open or closed based on the reference white plate data (the reference data and newly obtained data) in steps after step S507. This is because the determination based only on the black reference data (whether external light is present or absent) is not sufficiently reliable for the determination. This is because, when the black reference data is obtained in a dark place with a little external light, properly determining whether the ADF 5 is open or closed is impossible because there is no external light in the first place.

In the next step S509, the CPU 25 determines whether the ADF 5 is open or closed based on the reference white plate data obtained by reading the reference white plate.

The CPU 25 determines whether the ADF 5 is open in step S509 for the opening/closing detection determining process. When an affirmative determination is made (Yes in S509), the process goes to the process for the ADF 5 in an open state in S511. When a negative determination is made (No in step S509), i.e., the ADF is closed, the process goes to the process for the ADF 5 in a closed state in S510. Alternatively, in some embodiments, the CPU 25 determines whether the ADF 5 is open or closed through the above-described steps only when the pressure-plate opening/closing sensor 110 detects the closing state of the ADF 5. Such a configuration prevents unnecessary reading operation when the pressure plate is surely open, based on the detection result of the pressure-plate opening/closing sensor 110. This increases responsiveness of a user's operation and promotes the energy savings. When the ADF is closed, the CPU 25 performs the process for the ADF in a closed state (step S510). The process for the ADF in a closed state is a process of informing a higher-level program controlling the reading units 45 and 69 of the state of the ADF 5. The process for the ADF 5 in a closed state is not limited to the opening/closing detection based on the read data, and may be the same process as when the closed state is detected in the configuration that mechanically detects the opening/closing state with the pressure-plate opening/closing sensor. The CPU 25 stores the state at this time, and when the CPU 25 determines the same closed state again in the next determination processing after step S512 for waiting for the period of time, no process is performed.

When the ADF 5 is open, the CPU 25 performs the process for the ADF in an open state (S511). The ADF opening process is not limited to the opening/closing detection based on the read data, and may be the same process as when the open state is detected in the configuration that mechanically detects the opening/closing state with the pressure-plate opening/closing sensor. For example, the CPU 25 informs the user of closing the ADF 5 with a message. The CPU 25 stores the state at this time, and when CPU 25 determines the same state again in the next determination processing after step S512 for waiting for the period of time, no process is performed.

After waiting for a fixed period of time, the process is repeated from the first step.

In some embodiments, the image reading device 4 further includes an alarm 120 to inform a user of an open state of the pressure plate. Further, the alarm 120 informs the user that the pressure plate is open when the CPU 25 detects that the pressure plate is open (including a half-open state of the pressure plate). Such a configuration allows the user's appropriate operation at an appropriate timing, thereby preventing the reading operation and image-forming operation when the pressure plate is not completely closed.

According to the image reading device according to at least one embodiment of the present disclosure, the detection accuracy of the closed state of the pressure plate is increased, which prevents a deterioration in formed images due to external light and an image distortion due to the displacement of the document. Such a configuration further prevents unnecessary scanning operations because the pressure plate is surely closed in a startup of scanning, thus preventing a displacement of documents and errors in sheet conveyance.

A pressure plate opening/closing detection method of the image reading device 4 having the above-described configurations includes determining the presence or absence of external light input to the gap between the pressure plate and surface of the contact glasses 41 and 42 based on image data output by the reading units 45 and 69 when the light source is turned off; comparing read data for light emitted from the light source and received by the image sensor, with read data as a reference value that is obtained by turning on the light source when the pressure plate is completely closed, to obtain a difference and determined whether there is an attenuation in data; determining whether the pressure plate is open or closed based on a result in the determining the presence or absence of external light and a result in the obtaining difference and determining whether there is an attenuation in data.

In the present disclosure, the pressure-plate opening/closing sensor and the CIS (contact type image sensor) are used to perform the opening/closing detection through the external light detection when the light source is turned off. Subsequently, the output of the CIS when the light source is turned on is compared with the output of the CIS when the pressure plate is completely closed, so as to detect whether the pressure plate is completely closed.

The pressure-plate opening/closing detection method of the image reading device 4 according to the embodiments of the present disclosure increases the detection accuracy of the closed state of the pressure plate while preventing a deterioration in images due to external light and the image distortion due to the displacement of documents caused by opening of the pressure plate. Such a configuration further prevents unnecessary scanning operations because the pressure plate is surely closed in a start-up of scanning, thus preventing a displacement of documents and errors in sheet conveyance.

Hence, the configuration according to the embodiments of the present disclosure increases the accuracy of detection of the closed state of the ADF by using read data obtained when the light source of the image reading unit is turned on, which allows a reliable detection of a closed state of a pressure plate even only by detecting external light with an image forming apparatus used in a dark place with little external light.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. An image reading device comprising:
    a contact glass having a surface on which a document is disposed or along which the document moves;
    a reading unit including a light source configured to emit light to the document on the surface of the contact glass and an image sensor configured to receive the light reflected by the document, the reading unit configured to obtain image data according to the light received by the image sensor;
    a pressure plate moveable between a posture where the surface of the contact glass is closed and a posture where the surface of the contact glass is opened;
    a pressure-plate opening/closing sensor configured to detect whether the pressure plate is closed; and
    circuitry that
        determines a presence or absence of external light input to a space between the pressure plate and the surface of the contact glass based on black reference image data obtained by the reading unit when the light source is turned off,
        compares read white data of the light emitted from the light source and received by the image sensor when the pressure plate is closed, with reference read white data of the light emitted from the light source and received by the image sensor when the pressure plate is completely closed, to determine a difference between the read white data and the reference read white data, and
        determines whether the pressure plate is open or closed based on the determined presence or absence of the external light when the light source is turned off and the determined difference between the read white data and the reference read white data.

2. The image reading device according to claim 1, wherein the circuitry determines whether the pressure plate is open or closed only when the pressure-plate opening/closing sensor detects that the pressure plate is closed.

3. The image reading device according to claim 1, wherein the circuitry further includes an alarm to report that the pressure plate is open when detecting that the pressure plate is open.

4. A method of detecting opening/closing of pressure-plate, used for an image reading device including
    a contact glass having a surface on which a document is disposed or along which the document moves,
    a reading unit including a light source configured to emit light to the document on the surface of the contact glass and an image sensor configured to receive the light reflected by the document, the reading unit configured to obtain image data according to the light received by the image sensor,
    a pressure plate moveable between a posture where the surface of the contact glass is closed and a posture where the surface of the contact glass is opened, and
    a pressure-plate opening/closing sensor configured to detect whether the pressure plate is closed,
    the method comprising:
    determining a presence or absence of external light input to a space between the pressure plate and the surface of the contact glass based on black reference image data obtained by the reading unit when the light source is turned off;
    comparing read white data of the light emitted from the light source and received by the image sensor when the pressure plate is closed, with reference white read data of the light emitted from the light source and received by the image sensor when the pressure plate is completely closed, to determine a difference between the read white data and the reference read white data; and
    determining whether the pressure plate is open or closed based on the determined presence or absence of the external light when the light source is turned off and the difference between the read white data and the reference read white data.

5. An image forming apparatus comprising the image reading device according to claim 1.

6. The image reading device according to claim 1, wherein the circuitry performs a first opening/closing detection determination of the pressure plate by detecting of the presence or absence of the external light, based on the read black reference image data.

7. The image reading device according to claim 1, wherein the circuitry performs a second opening/closing detection determination when the pressure plate is determined to be closed at the first opening/closing detection determination.

\* \* \* \* \*